Nov. 9, 1926.
G. L. KNOX
1,606,242
TRAILER COUPLING
Filed March 30, 1925    3 Sheets-Sheet 1
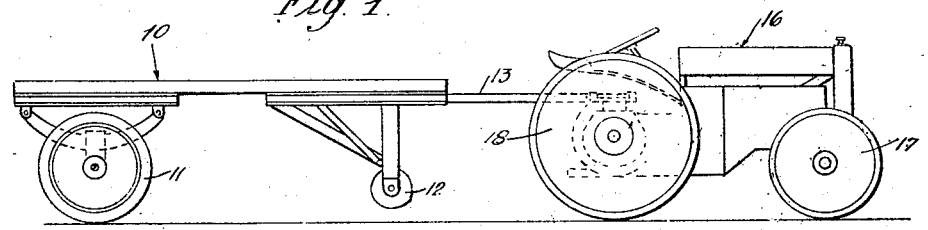
Fig. 1.
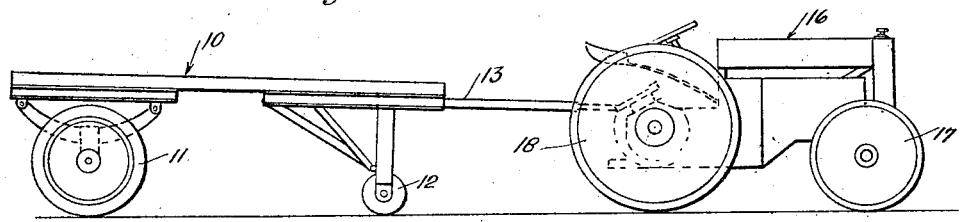
Fig. 2.
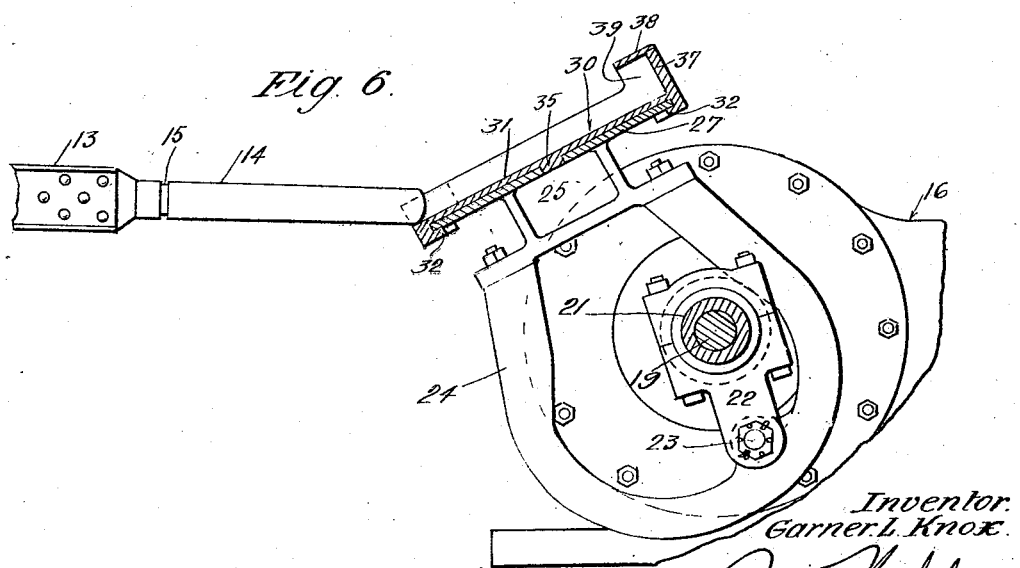
Fig. 6.
Inventor.
Garner L. Knox.
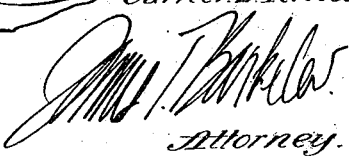
Attorney.

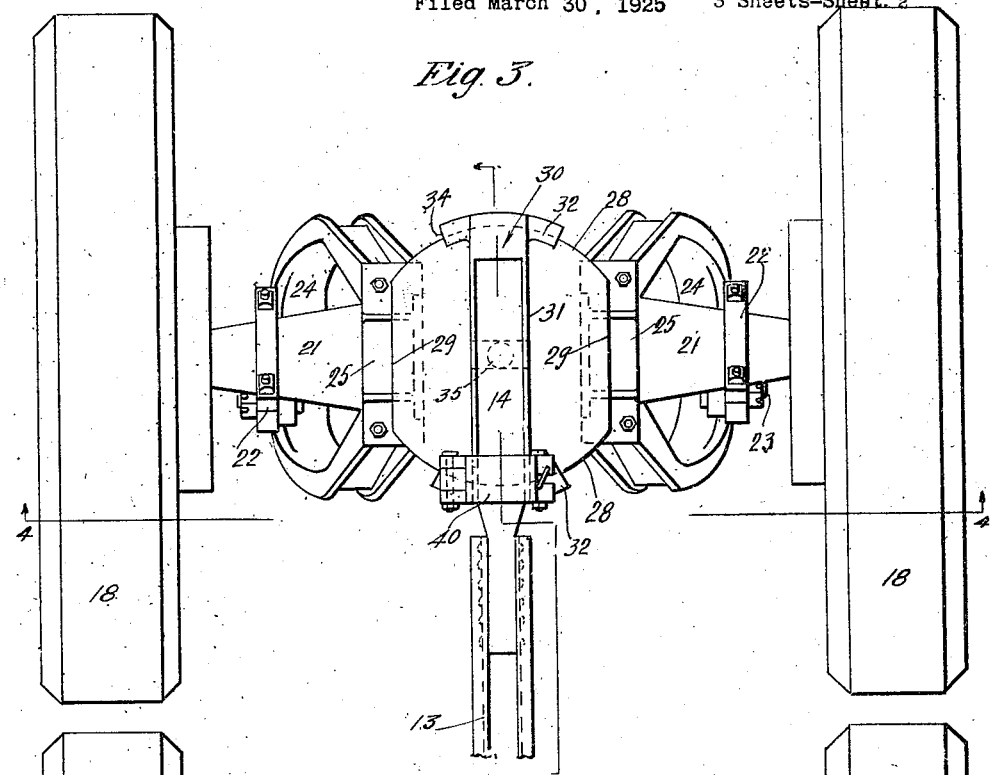
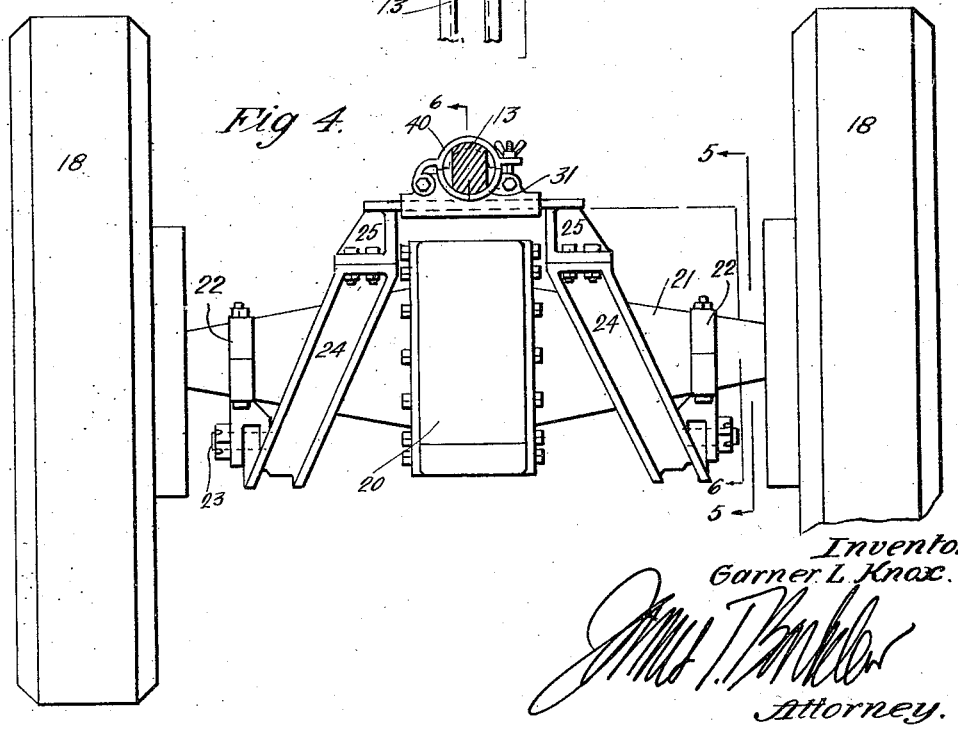

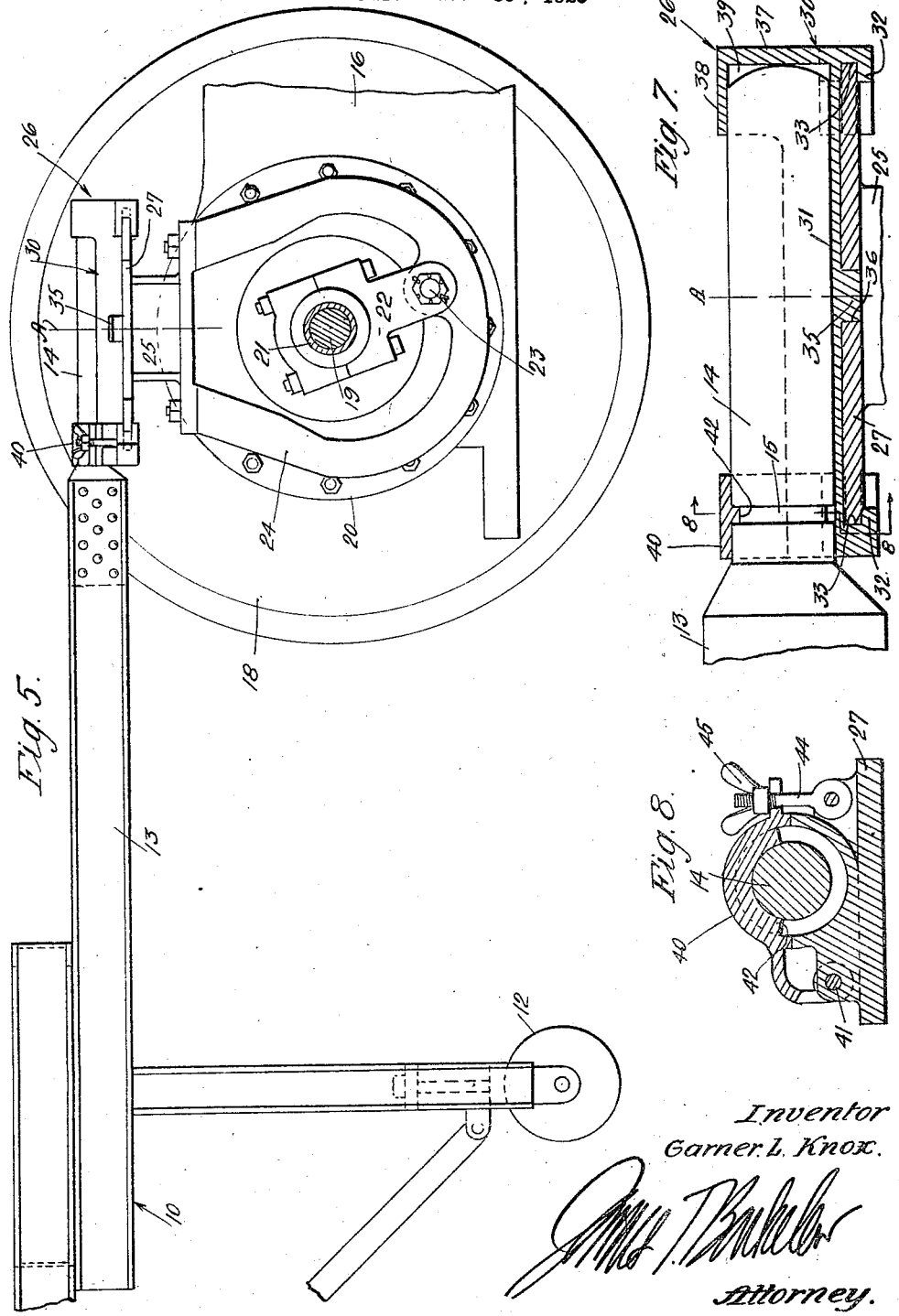

Patented Nov. 9, 1926.

1,606,242

UNITED STATES PATENT OFFICE.

GARNER L. KNOX, OF LOS ANGELES, CALIFORNIA, ASSIGNOR TO UTILITY TRAILER MANUFACTURING COMPANY, A CORPORATION OF CALIFORNIA.

TRAILER COUPLING.

Application filed March 30, 1925. Serial No. 19,223.

This invention relates generally to trailer couplings and is especially applicable to couplings adapted to two wheeled trailers, the forward ends of which are supported by the towing vehicle.

All tractors have a reaction tendency to tip up in front, this tendency being especially marked in tractors of a certain type. In my co-pending application for patent on trailer couplings filed April 9, 1923, Serial No. 630,752, and in Patent No. 1,524,503, January 27, 1925, on trailer couplings, issued jointly to Harold C. Bennett and myself, is shown a method of counter-acting this "rearing-up" tendency of tractors by coupling trailers thereto in a certain manner. Briefly described, this method comprises coupling means whereby the draft connection is below the rear axle of the tractor and the application of the trailer load is at a point below, but not behind said axle. How this effects the desired result is fully set up in said application and patent. In both the structures disclosed in said papers, there are provided a separate draft tongue and load imposing member, though it is to be noted that in the structure of the pending application the effective point of draft connection and the effective point of load imposition are one and the same. In both cases there is a swinging weight supporting structure adapted to pivotally engage the tractor at a point below, and not behind, the drive axle thereof, whereby the weight imposition member is capable of being automatically elevated and mounted thereon as the trailer enters into coupled engagement with the towing vehicle, thus lifting from the ground the skids or small wheels provided at the fore end of the trailer for supporting it when the trailer is dis-associated from the towing vehicle. A specific point of difference between the structures disclosed in the two papers in this: in the application, the swinging structure is permanently carried by the towing vehicle, while in the patented device the swinging structure is carried permanently by the weight imposition tongue of the trailer.

The present invention has all the features of said prior application and patent as to the self-mounting feature (characterized by a swinging weight supporting structure) point of effective draft connection and point of load imposition, but goes further in that all this is accomplished with the use of but a single tongue extending between trailer and tractor. It embodies the distinctive feature of the structure disclosed in the pending application as to a common point of effective draft application and weight imposition. As a further feature, this common point is located so it is below and normally ahead of the driving axle of the tractor, in place of being normally directly beneath said axle, the trailer weight thus constantly exerting a force tending to depress the forward end of the tractor, while any tendency of the forward end of the tractor to rise is opposed just in proportion to that tendency.

In Patent No. 1,524,504 on trailer couplings issued jointly to Harold C. Bennett and myself January 27, 1925, there is disclosed a type of coupling wherein a single tongue on the trailer serves as a draft connective and weight imposition member, the effective point of connection and weight imposition being below the driving axle of the tractor. However, the single tongue directly engages the tractor below said rear axle and is mounted by riding up an inclined plane stationarily mounted on the tractor, rather than engaging a swinging structure at a point above the common point of draft connection and load imposition and being elevated by virtue of such engagement, as is true of the present invention. One of the chief advantages of the present invention over the structure disclosed in the last-named patent resides in the fact that the point of tongue engagement may be above the driving axle of the tractor while the effective point of draft connection and weight imposition may be well below said axle, the major portion of the coupling thus being disposed where it is easily accessible and where road clearance does not have to be taken into account.

There are certain features of construction whereby the necessary flexibility between tractor and trailer is provided but these may be discussed to better advantage in the following detailed description, reference being made to the accompanying drawings, in which:

Fig. 1 is a longitudinal elevation showing a tractor and trailer coupled by my device;

Fig. 2 is a view similar to Fig. 1 but showing the tractor and trailer uncoupled;

Fig. 3 is a fragmentary plan view showing the trailer tongue applied to the tractor carried portion of the coupling, the rear axle and driving wheels, only, of the tractor being shown;

Fig. 4 is a section on line 4—4 of Fig. 3;

Fig. 5 is a section on line 5—5 of Fig. 4, but showing also the forward end of the trailer;

Fig. 6 is a section, partly in elevation, on line 6—6 of Fig. 4, but showing the parts in the relative position shown in Fig. 2;

Fig. 7 is an enlarged, fragmentary section on line 6—6 of Fig. 3; and

Fig. 8 is a section on line 8—8 of Fig. 7.

In the drawings, numeral 10 designates generally a semi-trailer having traction wheels 11 and forward wheel or wheels 12, which latter are adapted to support the forward end of the trailer when uncoupled from the towing vehicle (Fig. 2). When towing vehicle and trailer are coupled, the forward end of the trailer is preferably elevated sufficiently to clear wheel 12 from the ground (Fig. 1).

Trailer 10 has a tongue 13, and in the embodiment of the invention here illustrated the tongue has a cylindrical terminal piece 14 bolted thereto, there being a peripheral groove 15 in the piece near the end of the tongue, proper. It is to be understood, however, that this specific end formation of the tongue is not essential to the invention, considered in its broader aspects, as will be made apparent later in the specification, and therefore this illustration and description of a specific structural feature is not to be considered as limitative on the invention, except as specifically so set forth in the claims. This remark applies with equal force to the drawings illustrating the rest of the structure as well as the following description thereof.

Numeral 16 indicates a towing vehicle, a rear wheel drive tractor, for instance, having guiding wheels 17 and rear drive wheels 18, the latter being on drive axle 19. Differential casing 20 is located centrally of axle housing 21, the housing and tractor body, of course, moving as one about the rear axle when the forward end of the tractor is elevated or lowered, as when traveling over uneven ground or starting up or down grade.

For mounting and coupling to the trailer tongue, I have provided on the tractor a supporting structure adapted to swing on a horizontal axis located below the rear axle and extending substantially in parallelism therewith. For instance, I provide arms or hangers 22 at opposite sides of the differential casing, these hangers preferably being clamped to axle housing 21 near wheels 18. Arms 22 support horizontally extending pivot pins 23 below and, preferably, normally forward of the rear axle, as shown. The significance of this pivot location will be made apparent later.

Pivoted on each pin 23 is a yoke 24 having two arms that extend upwardly to points above the rear axle. Member 25 bridges the differential casing and connects the four yoke arms. Now the swinging support structure so far described as consisting of yokes 24 and bridge 25, is especially adapted to present day tractor construction wherein the differential housing is situated midway between the rear wheels. The bulk of the differential casing and its nearness to the ground more or less precludes the disposition of the pivot pins below the differential casing, that is, centrally of the tractor, it consequently being desirable to make the point of support connection as close to the wheels as possible, where there is minimum interfering structure on the tractor. The spaced and connected yoke structure lends itself particularly well to conditions as they now exist but it is to be understood the invention, in its broader aspects, contemplates the use of a single, swinging yoke or member pivotally connected to the axle housing midway of the rear wheels, where tractor construction renders such an arrangement permissible and desirable.

On top bridge 25 is a turn-table arrangement 26 adapted to be engaged by the trailer tongue. While any type of table suitable to the purpose lies within the scope of my broader claims, I will describe in some detail the arrangement illustrated to give a clear understanding of its operation.

The table portion of the device is a plate 27 integral with or stationarily mounted on bridge 25. The fore and aft edges 28 of the plate are arcuately cut about a common vertical axis A (Fig. 5) while the parallel sides 29 of the plate are chordal.

Tongue engagement member 30 includes an elongated channel 31 of arcuate cross-section having vertically spaced, inturned flanges 32 provided at each end. Flanges 32 define between them ways 33 adapted to take plate edges 28, the flanges preferably being arcuately extended beyond the sides of channel 31 as at 34 in order to give ample bearing surface. It will be evident from the above that member 30 may be swung over plate 27 about axis A, and that when member 30 is swung through an angle of approximately 90° from the position of Fig. 3, flanges 32 clear the plate, due to the chordal characteristics of sides 29, and separative vertical movement of the channel may be set up to disassemble the turn-table. It is preferable, though not necessary, that channel 31 be provided with a depending centering stud 35, with its axis coincident with axis A, adapted to rotate within a central bearing bore 36 in plate 27.

Channel 31 is closed at one end 37 and has a portion 38, of arcuate cross-section, overhanging the channel groove at that end, an end socket 39 being thus defined.

When the trailer is uncoupled, swinging support yokes 24 are in the position of Figs. 2 and 6, the swinging structure being limited in its movement in a counterclockwise direction, as viewed in these figures, by engagement with the differential casing, for instance. Table 27 and channel 30 thus incline downwardly and rearwardly and are at such a height above the ground that the forward terminal of the trailer tongue is in a horizontal plane intersecting the table plane near its lower edge. Hence, when the tractor is backed towards the trailer, or the trailer advanced towards the tractor, tongue terminal 14 may be guided into the groove of channel 30 and rides up the inclined plane, thus elevating the forward end of the trailer. As the nose of the trailer passes axis A, yokes 24 and associated parts swing forwardly on pivot pins 23, bringing table 27 into horizontal position, continued relative approaching movement between tractor and trailer moving the nose of terminal 14 into the end socket 39. An arcuate strap or keeper 40, pivoted on table 27 at 41 is swung over terminal 14, as shown in Figs. 7 and 8, an internal annular flange 42 on the collar being adapted to enter terminal groove 15. A bolt 44 and wing nut 45, or other suitable holding devices, are adapted to hold the keeper strap releasably in operative position.

It will be evident how flange 42 prevents accidental separative longitudinal movement between channel 31 and terminal 14 without preventing relative rotation thereof, this provision for rotation taking care of relative side tipping movement of tractor and trailer when passing over roads irregular in crown cross-section.

Straps 38 and 40 hold terminal 14 and channel 31 against spreading apart vertically and hold the swinging support structure against fore and aft swinging movement away from said terminal and out of operative position, thus limiting the swinging movement of the structure with relation to the tractor. The pivotal mounting of channel 31 on plate 27 allows relative movement between tractor and trailer when the direction of travel is changed. By reason of this rotatable mounting, it is found possible to mount the trailer tongue automatically in the manner described even though the tractor and trailer are out of longitudinal axial alinement.

Now it will be observed that the effective point of draft connection and the effective point of trailer weight imposition is at the pivotal connection between yokes 24 and the rear axle housing, that is, at pivot points 23 which are below and preferably forward of rear axle 19. There is, therefore, a constant tendency to hold the forward end of the tractor down, arising both from the draft connection and weight imposition. This is self-evident from a consideration of the drawings and foregoing description. If the front end of the tractor tends to rise, pivots 23 are carried forwardly and upwardly and the trailer weight acting on the pivots then immediately exerts more effectively a force tending to oppose that elevation.

It is to be understood that the drawings and description are to be considered merely as illustrative of and not restrictive on the broader claims appended hereto, for various changes in design, structure and arrangement may be made without departing from the spirit and scope of said claims.

I claim:

1. In a coupling device adapted to couple a trailer to a towing vehicle having a rear driving axle, means engageable by the trailer tongue at a point above said driving axle for supporting the trailer tongue on the towing vehicle and normally applying the weight of the trailer to the towing vehicle at a point below and ahead of said driving axle.

2. In a coupling device adapted to couple a trailer to a towing vehicle having a rear driving axle, means connected to the tractor and engageable by the trailer tongue at a point above said driving axle for supporting the trailer on the towing vehicle and applying the weight of the trailer to the towing vehicle at a point below said driving axle, and means adapted to hold said tongue and engageable means against relative separative movement whereby the tongue and member provide draft connective means between the tractor and trailer, the effective point of draft connection being at said point of weight application.

3. In a coupling device adapted to couple a trailer to a towing vehicle having a rear driving axle, means connected to the tractor and engageable by the trailer tongue at a point above said driving axle for supporting the trailer on the towing vehicle and applying the weight of the trailer to the towing vehicle at a point below said driving axle, and releasable means adapted to hold said tongue and engageable means against relative separative movement whereby the tongue and member provide draft connective means between the tractor and trailer, the effective point of draft connection being at said point of weight application.

4. In a coupling device adapted to couple a trailer to a towing vehicle having a rear driving axle, means connected to the tractor and engageable by the trailer tongue at a point above said driving axle for supporting the trailer on the towing vehicle and applying the weight of the trailer to the towing vehicle at a point below and normally ahead of said driving axle, and means adapted to hold said tongue and engageable means against relative separative movement whereby the tongue and member provide draft connective means between the tractor and trailer, the effective point of draft connection being at said point of weight application.

5. A device for raising and supporting a trailer tongue on a towing vehicle having a rear axle, embodying a structure swinging on a horizontal axis located below and normally ahead of the rear axle and having a part engageable by the trailer tongue whereby the tongue is supported.

6. A device for raising and supporting a trailer tongue on a towing vehicle having a rear axle, embodying a structure swinging on a horizontal axis located below and normally ahead of the rear axle and having a part extending above said axis and engageable by the trailer tongue whereby the tongue is supported.

7. A device for raising and supporting a trailer tongue on a towing vehicle having a rear axle, embodying a structure swinging on a horizontal axis located below and normally ahead of the rear axle and having a part extending above said axis and engageable by the trailer tongue whereby the tongue is supported, and coacting means on the tongue and swinging structure adapted to hold them in engagement.

8. A device for raising and supporting a trailer tongue on a towing vehicle having a rear axle, embodying a structure swinging on a horizontal axis located below and normally ahead of the rear axle and having a part extending above said axis and engageable by the trailer tongue whereby the tongue is supported, and coacting means on the tongue and swinging structure adapted to hold said structure against swinging relative to the tongue.

9. A device for raising and supporting a trailer tongue on a towing vehicle having a rear axle, embodying a structure swinging on a horizontal axis located below and normally ahead of the rear axle and having a part extending above said axis and engageable by the trailer tongue whereby the tongue is supported, and coacting means on the tongue and swinging structure adapted to hold said structure releasably against swinging relative to the tongue.

10. A device for raising and supporting a trailer tongue on a towing vehicle having a rear axle, embodying a structure swinging on a horizontal axis located below the rear axle and having a part extending above said axis and engageable by the trailer tongue whereby the tongue is supported, and coacting means on the tongue and swinging structure adapted to hold said structure against swinging relative to the tongue in a manner whereby said tongue is adapted to limit the swinging movement of the swinging structure with relation to the towing vehicle.

11. A device for raising and supporting a trailer tongue on a towing vehicle having a rear axle, embodying a structure swinging on a horizontal axis located below the rear axle and having a part extending above said axis and engageable by the trailer tongue whereby the tongue is supported, and coacting means on the tongue and swinging structure adapted to hold them in engagement, said tongue being axially revoluble on said structure when they are in engagement.

12. A device for raising and supporting a trailer tongue on a towing vehicle having a rear axle, embodying a structure swinging on a horizontal axis located below and normally ahead of the rear axle and having a part extending above said axis and engageable by the trailer tongue whereby the tongue is supported, and coacting means on the tongue and swinging structure adapted to hold them in engagement, said tongue being axially revoluble on and capable of swinging horizontally with respect to said structure when they are in engagement.

13. A coupling device adapted to couple a trailer to a wheeled towing vehicle, comprising a swinging structure adapted to swing on a horizontal axis on the towing vehicle, said axis being substantially parallel to and below the axis of rotation of the rear wheels of said vehicle, and means on the swinging structure adapted to take a trailer tongue, said means including a horizontally arranged turn-table device adapted to receive the tongue.

14. A coupling device adapted to couple a trailer to a towing vehicle, comprising a swinging structure adapted to swing on a horizontal axis on the towing vehicle, and means on the swinging structure adapted to take a trailer tongue, said means including a horizontally arranged turn-table device adapted to receive the tongue in a manner to allow axial rotation of said tongue.

15. A coupling device adapted to couple a trailer to a wheeled towing vehicle, comprising a swinging structure adapted to swing on a horizontal axis on the towing vehicle, said axis being substantially parallel to and below the axis of rotation of the rear wheels of said vehicle, means on the swinging structure adapted to take a trailer tongue, said means including a horizontally arranged turn-table device adapted to receive the tongue, and releasable means adapted to hold the tongue against separative movement with respect to said device.

16. A coupling device adapted to couple a trailer to a wheeled towing vehicle, comprising a swinging structure adapted to swing on a horizontal axis on the towing vehicle, said axis being substantially parallel to and below the axis of rotation of the rear wheels of said vehicle, and means on the swinging structure adapted to take a trailer tongue, said means including an upwardly opening channel member pivotally connected to the supporting structure on an approximately vertical axis, the terminal of the trailer tongue being receivable by the channel groove, and a releasable keeper adapted to hold said terminal in said groove.

17. A coupling device adapted to couple a trailer to a towing vehicle, comprising a swinging structure adapted to swing on a horizontal axis on the towing vehicle, and means on the swinging structure adapted to take a trailer tongue having a cylindrical terminal, said means including an upwardly opening channel member of arcuate cross-section and being pivotally connected to the supporting structure on an approximately vertical axis, the terminal of the trailer tongue being receivable by and being axially rotatable within the channel groove, and a releasable keeper adapted to hold said terminal in said groove.

18. In a coupling device adapted to couple a trailer to a towing vehicle having a rear driving axle, means connected to the tractor and engageable by the trailer tongue at a point above said driving axle for supporting the trailer on the towing vehicle and applying the weight of the trailer to the towing vehicle at a point below said driving axle, and means adapted to hold said tongue and engageable means against relative separative movement whereby the tongue and member provide draft connective means between the tractor and trailer, the effective point of draft connection being at said point of weight application.

19. A device for raising and supporting a trailer tongue on a towing vehicle having a rear axle, embodying a structure swinging on a horizontal axis located below the rear axle and having a part extending above said axis and engageable by the trailer tongue whereby the tongue is supported, and coacting means on the tongue and swinging structure adapted to hold said structure against swinging relative to the tongue.

In witness that I claim the foregoing I have hereunto subscribed my name this 17 day of March 1925.

GARNER L. KNOX.